United States Patent Office 2,964,458
Patented Dec. 13, 1960

2,964,458

PREPARATION OF ETHYLENE POLYMERS

Léon Ter-Minassian, Paris, France, assignor to Etablissement Public dit: Houilleres du Bassin du Nord et du Pas de Calais, Douai, France No Drawing. Filed July 17, 1957, Ser. No. 672,360

Claims priority, application France July 20, 1956

4 Claims. (Cl. 204—162)

This invention relates to the preparation of long-chain polymers from ethylenic hydrocarbons.

A process for synthesizing long-chain hydrocarbons, including various oils, waxes and other solid polymers many of which are well-suited for manufacturing processes by compression, injection, extrusion and the like, from ethylene, have been described by Paul Louis Fleury in "Principles of Polymer Industry," Cornell University Press, Ithaca, N.Y., 1953, pages 107 et seq. The process generally involves the use of a so-called initiator agent, which may be one of various substances. Initiator substances heretofore proposed have included oxygen, persulfates, azo-compounds, organometallic derivatives, amine oxides and others. The hydrocarbons thus obtained have in many cases been partly or totally reticulate in character. The term "reticulate" is herein used in a broad sense to designate the formation of cross links bridging the macromolecules and/or the formation of long bonding links or chains.

Related processes have also been proposed wherein the initiator agents, rather than being chemical substances, have been in the nature of physical agents, such as neutron beams, X-rays, alpha, beta and gamma rays and the like. Cf. "Science, 62 (1925), pp. 422, 441 and 593, and J.A.C.S., 48, (1926), pp. 1557 and 1575.

Where the polymerization synthesis process is initiated by means of radiation, it has been found that the length of the resulting polymer chains is increased:

(1) As the intensity of the radiation is decreased;
(2) As the temperature is increased, and
(3) As the density is increased.

It is also known that when an ionizing radiation is applied to a polymer macromolecule already formed, its structure is modified and hence the solubility and the softening and melting points of the resulting polymer are correspondingly altered. This is particularly true in connection with polyethylene whichever one of the above mentioned methods is used in obtaining it.

Such modifications in structure and in the physical characteristics of the polymer may be especially objectionable where the material is to serve in molding and similar processes. On the other hand, the same structural modifications may become an asset if they involve only the finished product. Generally speaking, the structural modifications which thus occur involve a partial or complete reticulation of the macromolecules. In the above mentioned process of synthesis using ionizing beams as the initiator agent, such reticulation and the attendant structural and physical modifications are liable to occur during the synthesis process itself. Hence, for the reasons pointed out above, polymers obtained by such processes very often are revealed to be badly suited for conventional manufacturing procedures.

The surprising discovery has now been made that, when hydrogen is added to an ethylenic hydrocarbon or a mixture of ethylenic hydrocarbons, in suitable proportions to be specified, the advantageous ionization method of initiating the polymerizing reaction may be safely applied in order to produce polyhydrocarbon macromolecules, without the reaction being attended by any objectionable structural modifications of the kind involving reticulation, whereby poly-hydrocarbons are consistently obtainable which are eminently well suited for various industrial applications.

Objects of the invention, therefore, are to prepare polyhydrocarbon compounds and polyethylene type polymers having uniformly improved physical characteristics, and especially to prepare such polymers which will be well suited for a variety of industrial manufacturing processes including molding, extrusion, and the like. An object is to provide such an improved method of preparation wherein an ethylenic monomer is polymerized with the help of a physical ionizing initiator agent.

According to the invention, a gaseous mixture of ethylene and hydrogen brought to a suitable density by conventional methods, is exposed to radiation. The proportion of hydrogen in the mixture should be selected in relation to the nature of the monomers. In the case of ethylene, from one to 50 molecules hydrogen may be used per 100 molecules of the mixture. It is found that when such a mixture is polymerized, polymer products may be produced having any desired molecular mass and melting point within the range found usable for conventional industrial processes, without such products including any insoluble, partly or totally reticulated areas heretofore found to be present.

A few examples will now be given to illustrate the practical procedure usable in performing the invention, such examples being merely illustrative but not restrictive of the scope of the invention.

Example 1

A pressure-resistant steel container 50 cc. in capacity is filled with pure hydrogen to a pressure of 20 atmospheres and the pressure in it is then built up to 265 atmospheres by the injection of pure ethylene. It is then exposed to a source of radio-cobalt 60 at a distance of 7 cm. from the container, at a temperature of 18° C., for a period of 45 hours. At the end of this time the gas is discharged from the container, and the container is found to contain 1 gram of a white, hornlike, porous mass of polyethylene which is totally soluble in hot xylene and has a melting range of about 120° C. to 125° C. By way of comparison, it is found that when pure ethylene is exposed to similar ionizing conditions but in the absence of hydrogen for a period of 30 hours, there is obtained about 1 gram of a polymer that is insoluble in boiling xylene.

Example 2

The same container as in Example 1 is first filled with hydrogen to a pressure of 40 atmospheres and is then brought to 240 atm. by injection of ethylene. Exposed to γ rays under similar conditions for 40 hours, 0.9 gram is obtained of a brittle polymer entirely soluble in hot xylene and having a melting range of 123–125° C. Observation under a polarizing microscope reveals that the material has a highly organized structure, which is in sharp contrast with that of a similar sample as obtained by conventional high pressure polymerization techniques.

Example 3

The same container filled with hydrogen to 50 atm. and ethylene to 230 atm., and exposed for 95 hours to radiation at an average intensity of 40 to 50 roentgens per minute, contains 1 gram of a highly organized pulverulent polymer, contrasting with a polyethylene sample as obtained by conventional low-pressure procedure. The product obtained in this example is totally soluble in hot xylene, and has a melting range of 119–120° C. and an inherent viscosity of 1.2.

What is claimed is:

1. In a process for preparing polyethylene by subjecting ethylene to gamma radiation for polymerizing the ethylene; the improvement which comprises subjecting pure ethylene mixed with pure hydrogen to said radiation under superatmospheric pressure, the mixture containing 1 to 50 moles of hydrogen per each 100 moles of the mixture, whereby substantial cross-linking is avoided and substantially linear polyethylene results.

2. The process as in claim 1; wherein the hydrogen and ethylene in said mixture are in the proportions of 20 atmospheres of hydrogen and 245 atmospheres of ethylene.

3. The process as in claim 1; wherein the hydrogen is present in said mixture in the proportion of 40 atmospheres of hydrogen per each 240 atmospheres of the mixture of hydrogen and ethylene.

4. The process as in claim 1; wherein the hydrogen is present in said mixture in the proportion of 50 atmospheres of hydrogen per each 230 atmospheres of the mixture of hydrogen and ethylene.

References Cited in the file of this patent

UNITED STATES PATENTS

| | | |
|---|---|---|
| 2,887,445 | Calfee et al. | May 19, 1959 |

FOREIGN PATENTS

| | | |
|---|---|---|
| 665,263 | Great Britain | Jan. 23, 1952 |
| 714,843 | Great Britain | Sept. 1, 1954 |
| 784,274 | Great Britain | Oct. 7, 1957 |

OTHER REFERENCES

Callinan: "J. Electrochemical Soc.," vol. 103, No. 5, pp. 292–296, May 1956.

"Chem. and Eng. News," vol. 34, No. 7, pp. 5758, 5760, November 19, 1956.

McLennan et al.: "Canadian J. of Research," vol. 5, pp. 470–481 (1931).

Lewis et al.: "Chemical Engineering Progress," vol. 50, No. 5, pp. 249–255, May 1954.